United States Patent [19]
Ohrbom et al.

[11] Patent Number: 6,037,441
[45] Date of Patent: Mar. 14, 2000

[54] NON-ACRYLIC DURABILITY ENHANCING AGENTS, METHOD THEREFORE AND CURED COATING COMPOSITIONS CONTAINING THE SAME

[75] Inventors: Walter H. Ohrbom, Hartland Township; John E. Boisseau, Bloomfield Hills; Donald L. St. Aubin, Commerce Township; John W. Rehfuss, West Bloomfield, all of Mich.

[73] Assignee: BASF Corporation, Southfield, Mich.

[21] Appl. No.: 08/769,622

[22] Filed: Dec. 18, 1996

[51] Int. Cl.[7] .......................... C08G 73/00; C08K 5/3492
[52] U.S. Cl. .......................... 528/367; 528/405; 528/423; 524/100; 525/375
[58] Field of Search .............................. 525/375; 528/367, 528/405, 423; 524/100

[56] References Cited

U.S. PATENT DOCUMENTS

| | | |
|---|---|---|
| 5,004,770 | 4/1991 | Cortolano et al. . |
| 5,096,950 | 3/1992 | Galbo et al. . |
| 5,106,891 | 4/1992 | Valet . |
| 5,124,378 | 6/1992 | Behrens et al. . |
| 5,216,156 | 6/1993 | Galbo et al. . |
| 5,461,151 | 10/1995 | Waterman . |
| 5,714,549 | 2/1998 | Wu et al. ................................ 525/375 |

*Primary Examiner*—Kriellion Sanders
*Attorney, Agent, or Firm*—Anne Gerry Sabourin

[57] ABSTRACT

A durability enhancing agent which comprises an ultraviolet light absorbing compound or hindered amine light stabilizer, or mixture thereof, bonded to a non-acrylic monomeric, oligomeric, or polymeric component, said agent comprising more than one carbamate functional group, group convertible to a carbamate group, or a group that crosslinks with a carbamate functional group. Also included is a coating composition including the durability enhancing agent for improved resistance to environmental etch.

10 Claims, No Drawings

NON-ACRYLIC DURABILITY ENHANCING AGENTS, METHOD THEREFORE AND CURED COATING COMPOSITIONS CONTAINING THE SAME

BACKGROUND OF THE INVENTION

1. Field of the Invention

The present invention relates to ultraviolet light absorber and hindered amine light stabilizer compounds, method therefore and coating compositions containing the same, wherein the compounds include a carbamate functionality.

2. Discussion of the Prior Art

Curable coating compositions such as thermoset coatings are widely used in the coatings art. They are often used for topcoats in the automotive and industrial coatings industry. Color-plus-clear composite coatings are particularly useful as topcoats where exceptional gloss, depth of color, distinctness of image, or special metallic effects are desired. The automotive industry has made extensive use of these coatings for automotive body panels. Color-plus-clear composite coatings, however, require an extremely high degree of clarity in the clearcoat to achieve the desired visual effect. High-gloss coatings also require a low degree of visual aberrations at the surface of the coating in order to achieve the desired visual effect such as high distinctness of image (DOI).

In the field of automotive coatings, it has become an objective to obtain a clearcoat (i.e., the outermost automotive coating) that is resistant to being etched by environmental fallout. Environmental etching is manifested by pitting, water spotting or chemical spotting of the coating or any combination of these. Environmental etch resistance is desirable because it improves the appearance and useful life of the coating.

Environmental etch resistance can be measured by visual examination of the coating, or by a profilometer or by subjecting a coating on a test panel to a saline solution in a temperature gradient oven test. Environmental etch resistance is generally measured by visual examination by individuals skilled at examining finishes for the degree of environmental etch therein. Environmental etch resistance has become more important as the amount of acid rain, and other industrial fallout has increased. Currently, environmental etching of automotive finishes is generally greatest in the areas most greatly affected by industrial fallout.

Coatings containing carbamate functional resins are known to exhibit good environmental etch resistance without free additions of durability enhancing agents (i.e. addition of HALS or UVAs that are not polymer- or oligomer-bound). The addition of free additions of HALS or UVA to such coating compositions does little to improve the environmental etch resistance of the coating compositions containing a carbamate functional resin.

Unexpectedly, it has been shown that environmental etch can be reduced by the use of oligomer-bound or polymer-bound non-acrylic ultraviolet light absorbing or hindered amine light stabilizing compounds including carbamate functionality.

SUMMARY OF THE INVENTION

According to the present invention, durability enhancing agents comprise ultraviolet light absorber (UVA) or hindered amine light stabilizer (HALS) compounds covalently bonded to a monomeric, oligomeric or polymeric component, and the durability enhancing agent comprises at least one carbamate functional group, group convertable to a carbamate functional group, or a group that crosslinks with a carbamate functional group. The monomer-, oligomer-, or polymer-bound UVA or HALS may also include additional reactive functionality which may or may not be crosslinked into a cured coating film.

The monomer-, oligomer- or polymer-bound HALS or UVA may comprise the principal resin, or a separate component of the coating composition. The invention is also directed to the cured coating composition, and a method for incorporating ultraviolet light absorbing and hindered amine light stabilizing compounds into a cured coating composition comprising reacting the ultraviolet light absorbing or hindered amine light stabilizing compound into a crosslinked matrix which is formed upon curing the coating composition.

The incorporation of the monomer-, oligomer-, or polymer-bound UVA and/or HALS having carbamate functionality into a coating composition stabilizes the HALS or UVA in a coating composition and provides the unexpected result of improved environmental etch resistance of the cured film.

DETAILED DESCRIPTION OF THE INVENTION

The present invention is a durability enhancing agent that is a monomer-bound, oligomer-bound or polymer-bound ultraviolet light absorber or hindered amine light stabilizer comprising a UVA or HALS, or a mixture of UVAs and/or HALS bonded to a non-acrylic monomer, oligomer or polymer, said agent including more than one carbamate functional group, group convertible to a carbamate group, or a group that crosslinks with a carbamate functional group. The carbamate functionality may be reacted on to the HALS or UVA first and then incorporated into the monomer, oligomer or polymer, or the carbamate may comprise part of the monomer, oligomer or polymer that reacts with the UVA or HALS. The durability enhancing agent may also have reactive functionality that is crosslinkable into a coating film.

The monomer-, oligomer- or polymer-bound UVA and/or HALS may be incorporated into a coating composition in combination with one or more additional UVA or HALS, if desired. Examples of ultraviolet light absorbers useful in the present invention include benzotriazoles, 2-hydroxybenzophenones, oxanilide, and 2-hydroxyphenyltriazines. Examples of useful benzotriazoles are described in U.S. Pat. No. 5,106,891, which is hereby incorporated by reference.

An example of benzotriazole useful in the present invention is shown in formula (Ia):

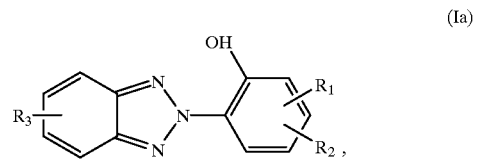

(Ia)

wherein, in the compounds of the formula (Ia), $R_1$, $R_2$ and $R_3$ can be hydrogen, but at least one of the radicals $R_1$ and $R_2$ must be other than hydrogen. Additionally, $R_1$, $R_2$ and $R_3$ can be halogen, hydroxyl halogen methyl, alkyl having 1 to 18 carbons, phenyl alkyl having 1 to 4 carbons in the alkyl moiety, hydroxy alkyl having 1 to 24 carbon atoms in the alkyl chain, such as methyl, ethyl, propyl, butyl, hexyl, octyl, nonyl, dodecyl, tetradecyl, hexadecyl, octadecyl, nonadecyl and eicosyl and also corresponding branched isomers, alkyl substituted by —COOH, —COOY$_8$, —CONH$_2$, —CONHY$_9$, —CONY$_9$Y$_{10}$, —NH$_2$, —NHY$_9$, —NY—$_9$Y$_{10}$, —NHCOY$_{11}$, —CN, and/or —OCOY$_{11}$, which has 4 to 20 carbon atoms, is interrupted by one or more oxygen atoms and is unsubstituted or substituted by hydroxyl or alkoxy having 1 to 12 carbon atoms, alkenyl having 3 to 6 carbon atoms, glycidyl, cyclohexyl which is unsubstituted or substituted by hydroxyl, alkyl having 1 to 4 carbon atoms and/or —OCOY$_{11}$, phenylalkyl which has 1 to 5 carbon atoms in the alkyl moiety and is unsubstituted or substituted by hydroxyl, chlorine and/or methyl, —COY$_{12}$ or —SO$_2$Y$_{13}$, or, if u is 2, Y$_2$ is alkylene having 2 to 16 carbon atoms, alkylene having 4 to 12 carbon atoms, xylene, alkylene which has 3 to 20 carbon atoms, is interrupted by one or more —O— atoms and/or substituted by hydroxyl, —CH$_2$CH(OH)CH$_2$—O—Y$_{15}$, —OCH$_2$CH(OH)CH$_2$,—CO—Y$_{16}$—CO—, —CO—NH—Y$_{17}$—NH—CO—, or —(CH$_2$)$_m$—CO$_2$—Y$_{18}$—OCO—(CH$_2$)$_m$, in which m is 1, 2 or 3, Y$_8$ is amine, alkylamine or cycloalkylamine wherein the alkyl or cycloalkyl portion has between 1 and 6 carbon atoms, alkyl having 1 to 18 carbon atoms, alkenyl having 3 to 18 carbon atoms, alkyl which has 3 to 20 carbon atoms, is interrupted by one or more oxygen or sulfur atoms or —NT$_6$— and/or is substituted by hydroxyl, alkyl which has 1 to 4 carbon atoms and is substituted by —P(O)(OY$_{14}$)$_2$, —NY$_9$Y$_{10}$ or —OCOY$_{11}$ and/or hydroxyl, alkenyl having 3 to 18 carbon atoms, glycidyl, or phenylalkyl having 1 to 5 carbon atoms in the alkyl moiety, Y$_9$ and Y$_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, or Y$_9$ and Y$_{10}$ together are alkylene, oxalkylene or azaalkylene having in each case 3 to 9 carbon atoms, Y$_{11}$ is alkyl having 1 to 18 carbon atoms, alkenyl having 2 to 18 carbon atoms or phenyl, Y$_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, Y$_{13}$ is alkyl having 1 to 18 carbon atoms, phenyl or alkyphenyl having 1 to 8 carbon atoms in the alkyl radical, Y$_{14}$ is alkyl having 1 to 12 carbon atoms or phenyl, Y$_{15}$ is alkylene having 2 to 10 carbon atoms, pheneylene or a group -phenylene-M-phenylene- in which M is —O—, —S—, —SO$_2$—, —CH$_2$— or —C(CH$_3$)$_2$—, Y$_{16}$ is alkylene, oxaalkylene or thiaalkylene having in each case 2 to 10 carbon atoms, phenylene or alkenylene having 2 to 6 carbon atoms, Y$_{17}$ is alkylene having 2 to 10 carbon atoms, phenylene or alkylphenlene having 1 to 11 carbon atoms in the alkyl moiety, and Y$_{18}$ is alkylene having 2 to 10 carbon atoms or alkylene which has 4 to 20 carbon atoms and is interrupted once or several times by oxygen.

R$_1$ may be phenylalkyl having 1 to 4 carbon atoms in the alkyl moiety, for example benzyl, and can also be cycloalkyl having 5 to 8 carbon atoms, for example cyclopentyl, cyclohexyl and cyclooctyl, or a radical of the formula

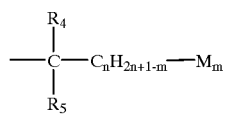

in which R$_4$ and R$_5$ independently of one another are alkyl having in each case 1 to 5 carbon atoms, in particular methyl, or R$_4$ together with the radical C$_n$H$_{2n+1-m}$, forms a cyclolakyl radical having 5 to 12 carbon atoms, for example cyclohexyl, cyclooctyl and cyclodecyl. M is a radical of the formula —COOR$_6$ in which R$_6$ is hydrogen, or alkyl having 1 to 12 carbon atoms, or alkoxyalkyl having 1 to 20 carbon atoms in each of the alkyl and the alkoxy moieties. Suitable alkyl radicals R$_6$ are those enumerated for R$_1$. Examples of suitable alkoxyalkyl groups are —C$_2$H$_4$OC$_2$H$_5$, —C$_2$H$_4$OC$_8$H$_{17}$ and —C$_4$H$_8$OC$_4$H$_9$. As phenylalkyl having 1 to 4 carbon atoms, R$_6$ is, for example, benzyl, cumyl, α-methylbenzyl or phenylbutyl.

At least one of the radicals R$_1$ and R$_2$ must be other than hydrogen.

Alternatively, the benzotriazole has the following formula:

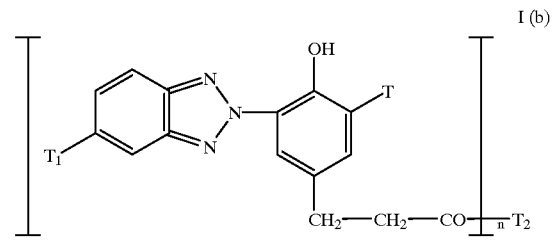

In the compounds of the formula (Ib) T is hydrogen or alkyl having 1 to 6 carbon atoms, such as methyl and butyl, T$_1$ is hydrogen, chlorine or alkyl or alkoxy having in each case 1 to 4 carbon atoms, for example methyl, methoxy and butoxy, and n is 1 or 2. If n is 1, T$_2$ is chlorine or a radical of the formula —OT$_3$ or

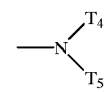

and if n is 2, T$_2$ is a radical of the formula

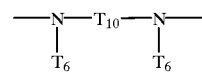

or —O—T$_9$—O—, where T$_3$ is hydrogen, alkyl which has 1 to 18 carbon atoms and is unsubstituted or substituted by 1 to 3 hydroxyl groups or by —OCOT$_6$, alkyl which has 3 to 18 carbon atoms, is interrupted once or several times by —O— or —NT$_6$— and is unsubstituted or substituted by hydroxyl or —OCOT$_6$. Examples of T$_3$ as cycloalkyl include cycloalkyl having 5 to 12 carbon atoms, such as cyclopentyl, cyclohexyl or cyclooctyl and is unsubstituted or substituted by hydroxyl and/or alkyl having 1 to 4 carbon atoms in the alkyl moiety, for example benzyl or phenylbutyl. T$_3$ can also be alkenyl having 2 to 18 carbon atoms. Suitable alkenyl radicals are derived from the alkyl radicals enumerated in the definitions of R$_1$. These alkenyl radicals can be substituted by hydroxyl. Examples of T$_3$ as phenylalkyl are benzyl, phenylethyl, cumyl, α-methylbenzyl or benzyl. T$_3$ can also be a radical of the formula —CH$_2$CH(OH)—T$_7$ or

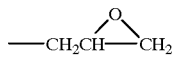

$T_4$ and $T_5$ independently of one another are hydrogen, alkyl having 1 to 18 carbon atoms, alkyl which has 3 to 18 carbon atoms and is interrupted once or several times by —O— or $NT_6$—, cycloalkyl having 5 to 12 carbon atoms, for example. phenyl, phenyl which is substituted by alkyl having 1 to 4 carbon atoms, alkenyl having 3 to 8 carbon atoms, phenylalkyl having 1 to 4 carbon atoms in the alkyl moiety or hydroxyalkyl having 2 to 4 carbon atoms, $T_6$ is hydrogen, alkyl having 1 to 18 carbon atoms, cycloalkyl having 5 to 12 carbon atoms, alkenyl having 3 to 8 carbon atoms, phenyl, phenyl which is substituted by alkyl having 1 to 4 carbon atoms, phenylalkyl having 1 to 4 carbon atoms in the alkyl moiety, $T_7$ is hydrogen, alkyl having 1 to 18 carbon atoms, phenyl which is unsubstituted or substituted by hydroxyl, phenylakyl having 1 to 4 carbon atoms in the alkyl moiety, or —$CH_2OT_8$, $T_8$ is alkyl having 1 to 18 carbon atoms, alkenyl having 3 to 8 carbon atoms, cycloalkyl having 5 to 10 carbon atoms, phenyl, phenyl which is substituted by alkyl having 1 to 4 carbon atoms, or phenylalkyl having 1 to 4 carbon atoms in the alkyl.

Alternatively, the polymer-bound ultraviolet light absorber may comprise triazines such as 2-hydroxyphenyl triazines having the formula (IIa)

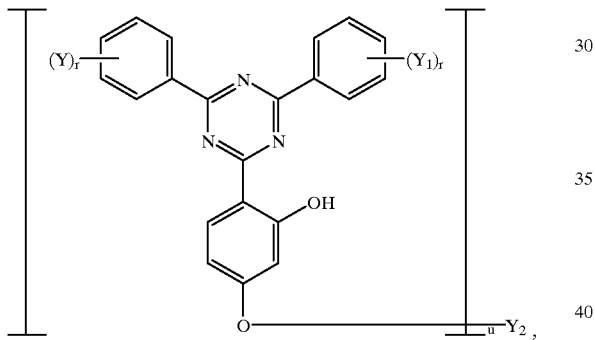

in the formula (IIa)
u is 1 to 2,
r is an integer from 1 to 3,
the substituents $Y_1$ independently of one another are hydrogen, hydroxyl, halogen, halogenomethyl, alkyl having 1 to 12 carbon atoms, alkoxy having 1 to 18 carbon atoms, when u is 1, $Y_2$ is alkyl having 1 to 18 carbon atoms, alkyl which has 1 to 12 carbon atoms and is substituted by —COOH —$COOY_8$, —$CONH_2$, $CONHY_9$, —$ONY_9Y_{10}$, —CN, —$OCOY_{11}$, or mixtures thereof; alkyl which has 4 to 20 carbon atoms which is interrupted by one or more oxygen atoms and is unsubstituted or substituted by hydroxyl or alkoxy having 1 to 12 carbon atoms; alkenyl having 3 to 6 carbon atoms, glycidyl, phenylalkyl which has 1 to 5 carbon atoms in the alkyl moiety and is unsubstituted or substituted by hydroxyl, chlorine and or methyl; —$COY_{12}$ or $SO_2 Y_{13}$, wherein $Y_8$ is amine, alkylamine or cycloalkylamine wherein the alkyl portion has from 1 to 6 carbon atoms, alkyl having 1 to 18 carbon atoms, alkenyl having 3 to 18 carbon atoms, alkyl which has 3 to 20 carbon atoms, and is interrupted by one or more oxygen atoms, or said alkyl substituted by substituted by hydroxyl; alkenyl having 3 to 18 carbon atoms, glycidyl or phenylalkyl having 1 to 5 carbon atoms in the alkyl moiety, $Y_9$ and $Y_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, $Y_{11}$ is alkyl having 1 to 18 carbon atoms, alkenyl having 2 to 18 carbon atoms or phenyl, $Y_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, $Y_{13}$ is alkyl having 1 to 18 carbon atoms, phenyl or alkylphenyl having 1 to 8 carbon atoms in the alkyl radical; and when u is 2, $Y_2$ is alkylene having 2 to 16 carbon atoms, alkylene having 4 to 12 carbon atoms and is interrupted by one or more —O— atoms and/or is substituted by hydroxyl; —$CH_2CH(OH)CH_2$—O—$Y_{15}$ —$OCH_2CH(OH)CH_2$, or —$(CH_2)_m$—$CO_2$—$Y_{18}$—OCO—$(CH_2)_m$, in which m is 1,2 or 3, $Y_{15}$ is alkylene having 2 to 10 carbon atoms, phenylene or a group -phenylene-M-phenylene- in which M is —O—, —S—, —$SO_2$—, —$CH_2$— or —$C(CH_3)_2$—, and $Y_{18}$ is alkylene having 2 to 10 carbon atoms or alkylene which has 4 to 20 carbon atoms and is interrupted once or several times by oxygen.

Other UVAs include triazines such as those described in U.S. Pat. No. 5,461,151 to Waterman, which is hereby incorporated by reference. These triazines have the formula:

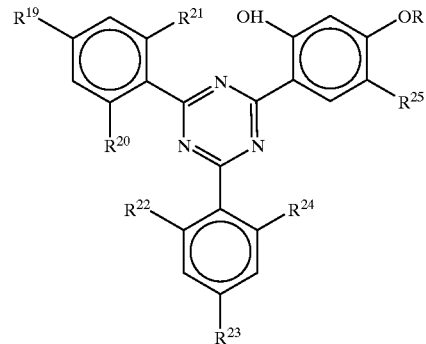

wherein the R moiety of the OR group is a linear or branched aliphatic alkyl group containing 3 carbon atoms substituted by one or more alkoxy groups of 1 to 12 carbon atoms, said moiety being further substituted by one or more hydroxy groups, and wherein $R^{19}$, $R^{20}$, $R^{21}$, $R^{22}$, $R^{23}$, $R^{24}$ and $R^{25}$ are independently selected from the group consisting of hydrogen, hydroxy, alkyl of 1 to 12 carbon atoms, alkoxy of 1 to 12 carbon atoms, sulfonic, halo, carboxy, haloalkyl and acrylamino.

In a preferred embodiement the triazine has the formula:

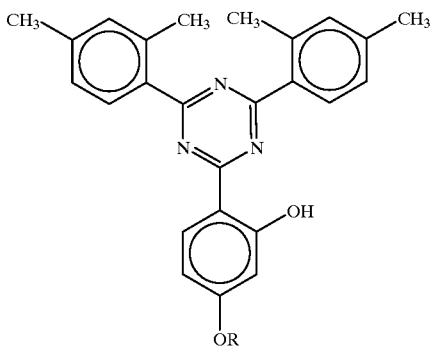

wherein the R moiety is, independently, a linear, branched aliphatic or cycloaliphatic alkyl moiety of 1 to 12 carbon atoms, and is:
(1) interrupted by one or more oxygen atoms; or
(2) substituted by one or more hydroxy groups; or
(3) both interrupted and substituted by the above groups of (1) and (2).

Examples of hindered amine light stabilizers useful in the present invention include derivatives of 2,2,6,6-tetramethylpiperidine. These stabilizers protect polymers by functioning as light-stable antioxidants. The hindered amine light stabilizers contain a reactive functionality thereon for reaction with the polymer or oligomer. The reactive functionality may comprise a group such as hydroxyl, carboxyl, amine, or ethylenically unsaturated group. The ultraviolet light absorber or hindered amine light stabilizer compounds are reacted onto the oligomer or polymer by addition or grafting reactions with the reactive functionality on the HALS or UVA. Example of such HALS are set forth in U.S. Pat. Nos. 5,216,156 to Galbo, 5,004,770 and 5,124,378 to Behrens et al.

One such example of a suitable HALS for purposes of the present invention is an O-substituted N-hydroxyl hindered amine light stabilizer having the formula:

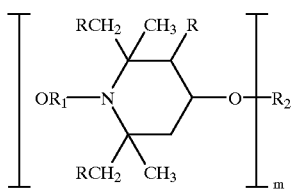

wherein
R is hydrogen or methyl,
$R_1$ is independenly $C_1$–$C_{18}$ alkyl, $C_2$–$C_{18}$ alkenyl, $C_2$–$C_{18}$ alkynyl, $C_5$–$C_{12}$ cycloalkyl, $C_6$–$C_{10}$ bicycloalkyl, $C_5$–$C_8$ cycloalkenyl, $C_6$–$C_{10}$ aryl, $C_7$–$C_9$ aralkyl, $C_7$–$C_9$ aralkyl substituted by alkyl or aryl, or

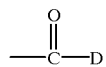

wherein
D is $C_1$–$C_{18}$ alkyl, $C_1$–$C_{18}$ alkoxy, phenyl, phenyl substituted by hydroxy, alkyl or alkoxy, or amino or amino mono- or disubstituted by alkyl or phenyl;
m is 1–4, when m is 1,
$R_2$ is hydrogen, $C_1$–$C_{18}$ alkyl optionally interrupted by one or more oxygen atoms, $C_2$–$C_{12}$ alkenyl, $C_6$–$C_{10}$ aryl, $C_7$–$C_{18}$ aralkyl, glycidyl, a monovalent acyl radical of an aliphatic cycloaliphatic, araliphatic or aromatic carboxylic acid, or of a carbamic acid

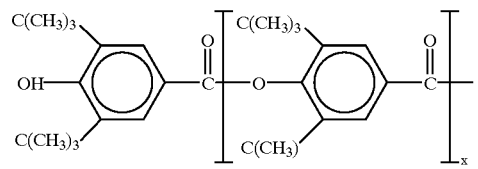

wherein
x is 0 or 1, or

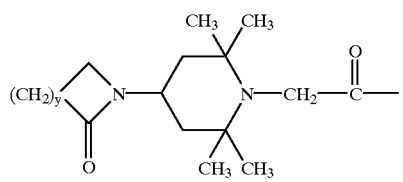

wherein
y is 2–4;
when m is 2,
$R_2$ is $C_1$–$C_{12}$ alkylene, $C_4$–$C_{12}$ alkenylene, xylylene, a divalent acyl radical of an aliphatic, cycloaliphatic, araliphatic or aromatic dicarboxylic acid or of a dicarbamic acid,
when m is 3, $R_2$ is a trivalent acyl radical of an aliphatic, unsaturated aliphatic, cycloaliphatic, or aromatic tricarboxylic acid;
when m is 4, $R_2$ is a tetravalent acyl radical of a saturated or unsaturated aliphatic or aromatic tetracarboxylic acid;
p is 1, 2 or 3.

Another example of a suitable HALS for purposes of the present invention has the formula:

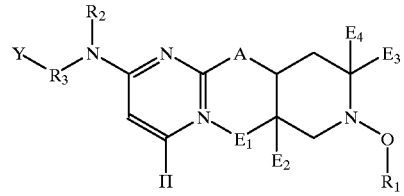

wherein
$E_1$, $E_2$, $E_3$ and $E_4$ are independently alkyl of 1 to 4 carbon atoms, or $E_1$ and $E_2$ are independently alkyl of 1 to 4 carbon atoms and $E_3$ and $E_4$ taken together are pentamethylene, or $E_1$ and $E_2$; and $E_3$ and $E_4$ each taken together are pentamethylene,
$R_1$ is alkyl of 1 to 18 carbon atoms, cycloalkyl of 5 to 12 carbon atoms, a bicyclic or tricyclic hydrocarbon radical of 7 to 12 carbon atoms, phenylalkyl of 7 to 12 carbon atoms, phenylalkyl of 7 to 15 carbon atoms, aryl of 6 to 10 carbon atoms or said aryl substituted by one to three alkyl of 1 to 8 carbon atoms,
$R_2$ is hydrogen or a linear or branched chain alkyl of 1 to 12 carbon atoms, $R_3$ is alkylene of 1 to 8 carbon atoms, or $R_3$ is —CO—, —CO—$R_4$—, —CONR$_2$—, or —CO—NR—$R_4$, $R_4$ is alkylene of 1 to 8 carbon atoms, T is phenoxy, phenoxy substituted by one or two alkyl groups of 1 to 4 carbon atoms, alkoxy of 1 to 8 carbon atoms or —N(R$_2$)$_2$ with the stipulation that R$_2$ is not hydrogen, or T is

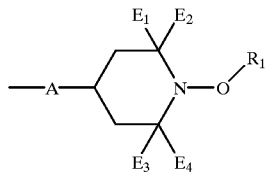

X is —NH$_2$, —NCO, —OH, —O-glycidyl, or —NHNH$_2$, and

Y is —OH, —NH$_2$, —NHR$_2$ where R$_2$ is not hydrogen; or Y is —NCO, —COOH, oxiranyl, —O-glycidyl, or —Si(OR$_2$)$_3$; or the combination R$_3$— Y— is —CH$_2$OR$_2$.

In a preferred embodiment $E_1$ to $E_4$ are each methyl;

$R_1$ is cyclohexyl, octyl, methyl, or heptyl;

$R_2$ is hydrogen, butyl, or dodecyl;

$R_3$ is ethylene when Y is —OH or $R_3$ is pentamethylene when Y is —COOH;

$R_4$ is ethylene or hexamethylene; and

A is —N(R$_7$)— wherein $R_7$ is butyl.

The ultraviolet light absorber or hindered amine light stabilizer compounds are reacted onto the oligomer or polymer by addition or grafting reactions.

The durability enhancing agent has at least one carbamate group or group convertible to a carbamate group thereon. The carbamate may be reacted on to the monomeric, oligomeric or polymeric component and the component reacted with the UVA or HALS, or alternatively the UVA or HALS may include the carbamate functionality.

Carbamate groups can generally be characterized by the formula:

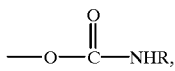

where R represents H, alkyl, preferably of 1 to 6 carbon atoms, or cycloalkyl, preferably up to 6 ring carbon atoms. The terms alkyl and cycloalkyl include substituted alkyl and cycloalkyl groups, such as halogen substituted alkyl or cycloalkyl.

Groups that can be converted to carbamate include cyclic carbonate groups, epoxy groups, and unsaturated bonds. Cyclic carbonate groups can be converted to carbamate groups by reaction with ammonia or a primary amine, which ring-opens the cyclic carbonate to form a β-hydroxy carbamate. Epoxy groups can be converted to carbamate groups by first converting to a cyclic carbonate group by reaction with CO$_2$. This can be done at any pressure from atmospheric up to supercritical CO$_2$ pressures, but is preferably under elevated pressure (e.g. 60–150 psi). The temperature for this reaction is preferably 60–150° C. Useful catalysts include any that activate an oxirane ring, such as tertiary amine or quaternary salts (e.g. tetramethyl ammonium bromide), combinations of complex organotin halides and alkyl phosphonium halides (e.g., ((CH)$_3$SnI, BU$_4$SnI, Bu$_4$PI, and (CH$_3$)$_4$PI), potassium salts (e.g., K$_2$CO$_3$, KI) preferably in combination with crown ethers, tin octoate, calcium octoate, and the like. The cyclic carbonate group can then be converted to a carbamate group as described above. Any unsaturated bond can be converted to carbamate groups by first reacting with peroxide to convert to an epoxy group, then with CO$_2$ to form a cyclic carbonate, and then with ammonia or a primary amine to form the carbamate.

The monomeric, oligomeric and polymeric components of the present invention are defined as non-acrylic components. By non-acrylic is meant that the monomer, oligomer or polymer is not itself, and is not formed using styrene, acrylic acid, methacrylic acid, or the esters of acrylic and methacrylic acid in the reaction. The monomers, oligomers and polymers useful in the present invention include ester, ether, epoxy, alkyd, urethane, urea, amide, amiminoplast, isocyanate and silane monomers, oligomers and polymers and mixtures thereof.

The monomeric and oligomeric components have a molecular weight of between 148 and 2000, the preferred molecular weight for the oligomers is between 900 and 1092; polymers have a molecular weight of between 2,000 and 20,000, the preferred molecular weight for the polymers is between 4000 and 6000. These weights are prior to reaction of the components with the UVA or HALS. Molecular weight can be determined by the GPC method using a polystyrene standard. The carbamate content of the polymer, on a molecular weight per equivalent of carbamate functionality, will generally be between 200 and 1200, and preferably between 300 and 800.

One method of preparing oligomeric compounds is to react an alcohol ('alcohol' is defined herein as having one or more OH groups) with more than one urea to form a compound with carbamate groups. This reaction is accomplished by heating a mixture of the alcohol and ureas, under heat, preferably in the presence of a catalyst as is known in the art. Another technique is the reaction of an alcohol with cyanic acid to form a compound with primary carbamate groups (i.e., unsubstituted carbamates). Carbamates may also be prepared by reaction of an alcohol with phosgene and then ammonia to form a compound having primary carbamate groups, or by reaction of an alcohol with phosgene and then a primary amine to form a compound having secondary carbamate groups. Another approach is to react an isocyanate (e.g., HDI, IPDI) with a compound such as hydroxypropyl carbamate to form a carbamate-capped isocyanate derivative. Finally, carbamates can be prepared by a transcarbamylation approach where an alcohol is reacted with an alkyl carbamate (e.g., methyl carbamate, ethyl carbamate, butyl carbamate) to form a carbamate group-containing compound. This reaction is performed under heat, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", *Chemical Review*, v. 65, 1965.

Various alcohols can be used in the preparation of carbamate compounds useful in the invention. They generally have from 1 to 200 carbon atoms, preferably 1–60 carbon atoms, and may be monofunctional or polyfunctional (preferably a functionality of 2 to 3), aliphatic, aromatic, or cycloaliphatic. They may contain just OH groups, or they may contain OH groups plus heteroatoms such as O, S, Si, N, P, and other groups such as ester groups, ether groups, amino groups, or unsaturated sites. Examples of useful alcohols include 1,6-hexanediol,1,2-hexanediol, 2-ethyl-1, 3-hexanediol, ethyl-propyl-1,5-pentanediol, 2-methyl-2,4-pentanediol, 2,2,4-trimethyl-1,3-pentanediol, 2,4,7,9-tetramethyl-5-decyn-4,7-diol, 1,3-dihydroxyacetone dimer, 2-butene-1,4-diol, pantothenol, dimethyltartrate, pentaethylene glycol, dimethyl silyl dipropanol, and 2,2'-thiodiethanol.

The oligomer or polymer may comprise a polyester including carbamate functionality or having groups that can be converted into carbamate groups, such as an active hydrogen group or an ethylenically unsaturated group. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Alternatively, or in addition to, the polyester can be formulated with an acid or hydroxy functional carbamate, such as hydroxy propyl carbmate, or material convertible to carbamate, such as glycerin carbamate.

Polyurethane or polyurea oligomers or polymers useful in the present invention include polyurethanes or polyureas having carbamate groups or groups convertible to carbamate. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane).

Alternatively, or additionally, a urethane or urea, including monomeric, oligomeric, or polymeric urea or urethane can be formulated with an isocyanate reactive carbamate, such as hydroxy propyl carbamate or 2-amino ethyl carbamate, or a group that can be converted into a carbamate, such as glycerin carbamate.

The isocyanates suitable for any of these reactions include TDI, MDI, isophorone diisocyanate, hexamethylene diisocyanate and isocyanurate trimers of these.

Where the UVA or HALS is reacted onto the isocyanate, the UVA or HALS must include at least one isocyanate reactive functionality such as amino, or hydroxyl functionality. Where the non-acrylic monomeric, oligomeric or polymeric compounds as described above are used for reaction with a UVA or HALS, the UVA or HALS includes at least one group that can covalently bond with these compounds. For example, for reaction onto a polyester, the reactive functionality on the UVA or HALS may be ester, ether, hydroxyl, acid, or epoxy functionalities. Where the UVA or HALS is reacted onto a urea, urethane, or carbamate oligomer or polymer, the UVA or HALS must nclude at least one reactive functionality such as hydroxyl, amine, isocyante or epoxy.

In one embodiment the bound UVA or HALS is formed by reacting some of the isocyanate with a UVA or HALS having functionality reactive with the isocyanate. Examples of such functionality are hydroxy and amine functionality, preferably not sterically-hindered amines. Some of the remaining isocyanate groups are then carbamate functionalized by reaction with an isocyante reactable material that contains carbamate or a group that can be converted into carbamate. The polyisocyanates used are described in U.S. patent applications having Ser. Nos. 08/333,915, 08/547,513 and 08/686,929.

A coating composition according to the present invention includes a durability enhancing agent comprising a monomeric, oligomeric, or polymeric component having bonded thereto at least one HALS and/or UVA, said durability enhancing agent having appended thereto more than one carbamate functional group, or group convertible to a carbamate functional group. The durability enhancing agent may also include other reactive functionality that may be crosslinked into the film. The crosslinkable groups may or may not be on the same moiety as the carbamate functionality.

The durability enhancing agent may comprise the principal resin of the coating composition, or may be added separately to a coating composition.

A coating composition according to the present invention is cured by self crosslinking, or by reaction of the principal resin with a crosslinking agent having a plurality of functional groups that are reactive with the crosslinkable groups on the principal resin. Such reactive groups include active methylol or methylalkoxy groups on aminoplast crosslinking agents or on other compounds such as phenol/formaldehyde adducts, isocyanate groups, siloxane groups, cyclic carbonate groups, polyepoxy groups and anhydride groups. Examples of crosslinking agents or mixtures of crosslinkers include melamine formaldehyde resin (including monomeric or polymeric melamine resin and partially or fully alkylated melamine resin), a bis- or tris-(alkoxycarbonylamino)-1,3,5 triazine crosslinker from Cytec sold under the trademark TACT®, blocked or unblocked polyisocyanates (e.g., TDI, MDI, isophorone diisocyanate, hexamethylene diisocyanate, and isocyanurate trimers of these, which may be blocked for example with alcohols or oximes). Aminoplast resin such as melamine formaldehyde resin or urea formaldehyde resin are especially preferred.

The preferred aminoplast resins for this purpose include monomeric or polymeric melamine formaldehyde resins, alkoxylated melamine formaldehyde resins and mixtures of alkoxylated melamine formaldehyde resins. The isocyanate crosslinkers suitable for purposes of the present invention include TDI, MDI, isophorone diisocyanate, hexamethylene diisocyanate, and isocyanurate trimers of these, which may be blocked for example with alcohols or oximes selected from the group consisting of triazines benzotriazoles, 2-hydroxybenzophenone compounds, oxanilides, and mixtures thereof.

Where an aminoplast crosslinking agent is used, and the aminoplast is reacted with carbamate functionality, or functionality convertible to a carbamate, excess aminoplast groups are left to crosslink with the reactive functionality on the principal resin.

While the oligomer-bound or polymer-bound HALS may be used in any layer of a multi-layer coating composition, it is preferably used in a clearcoat composition. The clearcoat may be used alone or with a pigmented basecoat composition.

The pigmented basecoat composition may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are are preferably crosslinkable and comprise one or more type of cross-linkable functional groups. Such groups include, for example, hydroxy, isocyanate, amine, epoxy, acrylate, vinyl, silane, and acetoacetate groups. These groups may be masked or blocked in such a way so that they are unblocked and available for the cross-linking reaction under the desired curing conditions, generally elevated temperatures. Useful cross-linkable functional groups include hydroxy, epoxy, acid, anhydride, silane, and acetoacetate groups. Preferred cross-linkable functional groups include hydroxy functional groups and amino functional groups.

Basecoat polymers may be self-cross-linkable, or may require a separate cross-linking agent that is reactive with the functional groups of the polymer. When the polymer comprises hydroxy functional groups, for example, the cross-linking agent may be an aminoplast resin, isocyanate and blocked isocyanates (including isocyanurates), and acid or anhydride functional cross-linking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 93° C. and 177° C.

The invention is further illustrated by the following non-limiting examples.

EXAMPLES

Example 1

Monocarbamate Functional Triazine UVA

To a room temperature (20° C.) a solution of 309.8 parts urethane grade methyl isoamyl ketone, isophorone diisocyanate and 0.6 parts of dibutyl tin dilaurate kept under an inert atmosphere is added over two hours 80.4 parts of hydroxy propyl carbamate. During the addition of the hydroxy propyl carbamate, the temperature of the reaction batch is not allowed to go above 36° C. After the addition of hydroxy propyl carbamate is complete, the reaction temperature is kept below 40° C. and is followed be NCO titration and/or IR spectrometry. Once all of the hydroxy propyl carbamate is incorporated 353.5 parts of a hydroxy functional benzotriazole UVA[1] is then added and the reaction mixture temperature raised to 80° C. The reaction is followed using NCO titration and/or IR spectrometry. Once all of the benzotriazole has been incorporated, 20 parts of isobutyl alcohol is added. The reaction is kept at 80° C. until all of the isocyanate has been consumed. The final product is 65% NV.

[1]This hydroxy functional triazine is described in U.S. Pat. No. 5,461,151, and has the formula

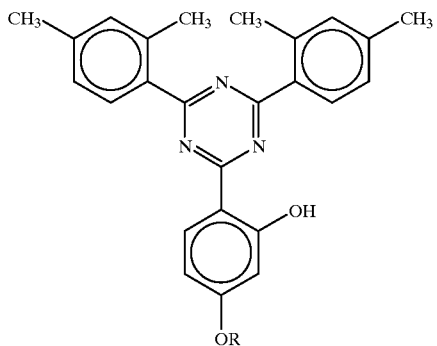

wherein the R moiety is, independently, a linear, branched aliphatic or cycloaliphatic alkyl moiety of 1 to 12 carbon atoms, and is:

(1) interrupted by one or more oxygen atoms; or
(2) substituted by one or more hydroxy groups; or
(3) both interrupted and substituted by the above groups of (1) and (2).

Example 2

Oligomer-Bound Ttriazine UVA

A mixture of 456 parts of a hydroxy methylated melamine, commercially available under the trademark Cymel® 300, 1131 parts of the product from Example 1, 500 parts of methanol, and 7 parts of dodecyl benzene sulfonic acid are heated to 69° C. The reaction mixture is kept at 69° C. until all of the product from example one is incorporated as determined by infra red spectrometry. Then 2.0 parts of 2-amino-2-methyl propanol is added. The system is them placed under vacuum (maximum temperature 69° C.) to remove the methanol and isobutanol solvents. The final product is 75.0% NV.

Example 3

Monocarbamate Functional Benzotriazole

To a room temperature (20° C.) solution of 259.3 parts urethane grade methyl isoamyl ketone, isophorone diisocyanate and 0.5 parts of dibutyl tin dilaurate kept under an inert atmosphere is added over two hours 80.4 parts of hydroxy propyl carbamate. During the addition the hydroxy propyl carbamate, the temperature of the reaction batch is not allowed to go above 36° C. After the addition of hydroxy propyl carbamate is complete, the reaction temperature is kept below 40° C. and is followed be NCO titration and/or IR spectrometry. Once all of the hydroxy propyl carbamate is incorporated 259.7 parts of a hydroxy functional copolymerizable benzotriazole is then added and the reaction mixture temperature raised to 80° C. The reaction is followed using NCO titration and/or IR spectrometry. Once all of the CGL-104 has been incorporated, 20 parts of isobutyl alcohol is added. The reaction is kept at 80° C. until all of the isocyanate has been consumed. The final product is 65% NV.

Example 4

Oligomer-Bound UVA

A mixture of 456 parts of Cymel® 300, an aminoplast crosslinker, 1006 parts of the product from Example 3, 500 parts of methanol, and 7 parts of dodecyl benzene sulfonic acid are heated to 69° C. The reaction mixture is kept at 69° C. until all of the product from Example 3 is incorporated as determined by infra red spectrometry. 2.0 parts of 2-amino-2-methyl propanol is then added. The is placed under vacuum (maximum temperature 69° C.) to remove the methanol and isobutanol solvents. The final product is 75.0% NV.

Example 5

Carbamate Functional HALS

To a room temperature (20° C.) solution of 298.9 parts urethane grade methyl isoamyl ketone, isophorone diisocyanate and 0.6 parts of dibutyl tin dilaurate kept under an inert atmosphere is added over two hours 80.4 parts of hydroxy propyl carbamate. During the addition the hydroxy propyl carbamate, the temperature of the reaction batch is not allowed to go above 40° C. After the addition of hydroxy propyl carbamate is complete, the reaction temperature is kept below 40° C. and is followed be NCO titration and/or IR spectrometry. Once all of the hydroxy propyl carbamate is incorporated 333.3 parts of a hydroxy functional HALS[2] is then added and the reaction mixture temperature raised to 80° C. The reaction is followed using NCO titration and/or IR spectrometry. Once all of the HALS has been incorporated, 20 parts of isobutyl alcohol is added. The reaction is kept at 80° C. until all of the isocyanate has been consumed. The final product is 65% NV.

[2]The hydroxy functional HALS is described in U.S. Pat. No. 5,216,156 and has the formula:

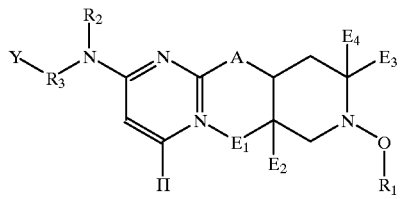

wherein $E_1$ to $E_4$ are each methyl, $R_1$ is cyclohexyl, octyl, methyl, or heptyl;

$R_2$ is hydrogen, butyl, or dodecyl;

$R_3$ is ethylene when Y is —OH or $R_3$ is pentamethylene when Y is —COOH;

$R_4$ is ethylene or hexamethylene; and

A is —N($R_7$)— wherein $R_7$ is butyl;

T is phenoxy, phenoxy substituted by one or two alkyl groups of 1 to 4 carbon atoms, alkoxy of 1 to 8 carbon atoms.

Example 6

Oligomer-Bound HALS

A mixture of 456 parts of Cymel® 300 hydroxy methylated melamine, 1190 parts of the product from example (3), 500 parts of methanol, and 7 parts of dodecyl benzene sulfonic acid are heated to 69° C. The reaction mixture is kept at 69° C. until all of the product from Example 5 is incorporated as determined by infra red spectrometry. Then 2.0 parts of 2-amino-2-methyl propanol is added. The system is them placed under vacuum (maximum temperature 69° C.) to remove the methanol and isobutanol solvents. The final product is 75.0% NV.

Example 7

Oligomer-Bound Triazine UVA

A mixture of 164.9 parts of methyl isoamyl ketone, 210 parts of T1890 (the isocyanurate of isophorone diisocyanate sold by Hüls) 90 parts of amyl acetate and 0.1 parts of dibutyl tin dilaurate was heated to 60° C. under an inert atmosphere. 161.1 parts of a hydroxy functional UVA[3] was then added. The system was then heated to 85° C. and monitored by NCO titration and IR spectrometry, until all of the UVA was incorporated. 68.4 parts of hydroxy propyl carbamate was then added. The reaction temperature was allowed to exotherm to 87° C. The system was kept above 80° C. until all of the hydroxy propyl carbamate was incorporated. Then 43.3 parts of isobutanol and 100 parts of methyl isoamyl ketone was added. The reaction mixture was kept above 80° C. until the system tested free of isocyanate by IR spectrometry. and/or isocyanate titration. The final product had a NV of 49.3%

[3]Triazine UVA as described in Ex 1.

Coating Example (Control)

A control coating composition was prepared having the following formulation:

| Ingredient | Amount |
| --- | --- |
| Carbamate functional acrylic resin[1] | 75.51 |
| Resimine 747 Aminoplast | 20.66 |

-continued

| Ingredient | Amount |
| --- | --- |
| Acid Catalyst | 1.00 |
| Fumed Silica Rheology Control Additive | 1.31 |
| Flow Control Additive | 0.20 |
| Adhesion promoter | 1.32 |
| Total | 100.00 |

[1]Carbamate functional acrylic available from BASF Corp. under the trademark Ureclear ®, as described in U.S. Pat. No. 5,356,669.

Comparative Results for Coating Compositions Containing UVAs and HALS

To the control coating composition set forth above were added the following UVA and HALS components. Amounts are in percent by weight based on total coating composition solids content.

| UVA or HALS Additive | Ex. A | Ex. B |
| --- | --- | --- |
| Oligomer-Bound UVA from Ex. 4 | 2.0% | — |
| Oliogomer-Bound HALS from Ex. 6 | 1.5% | 1.5% |
| Oligomer Bound Triazine UVA per Ex. 7 | 1.0% | 1.0% |
| Benzotriazole UVA free add* | — | 2.0% |

*Proprietary UVA component that is not polymer or oligomer bound.

| Comparative Results for Etch | |
| --- | --- |
| Example | Etch Rating after 10 weeks** |
| Control | 6 |
| Ex. A | 4 |
| Ex. B | 5 |

We claim:

1. A durability enchancing agent comprising the reaction product of a) ultraviolet light absorbers (UVAs) and mixtures thereof having a reactive functionality thereon; and b) a non-acrylic monomeric, oligomeric or polymeric component, having a reactive functionality thereon to react with the reactive functionality of a), wherein either a) or b) includes more than one carbamate functional group, group convertible to a carbamate group, or a group that crosslinks with a carbamate functional group, and the final product is a monomer-, oligomer or polymer bound UVA that includes more than one carbamate functional group, group convertible to a carbamate group, or a group that crosslinks with a carbamate functional group, wherein the UVA is selected from the group consisting of polymer-bound 2-hydroxyphenyl triazines having the formula

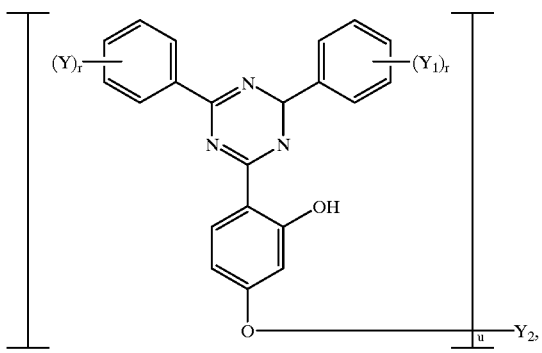

in the formula (IIa)

u is 1 to 2, r is an integer from 1 to 3, the substituents $Y_1$ independently of one another are hydrogen, hydroxyl, halogen, halogenomethyl, alkyl having 1 to 12 carbon atoms, alkoxy having 1 to 18 carbon atoms, when u is 1, $Y_2$ is alkyl having 1 to 18 carbon atoms, alkyl which has 1 to 12 carbon atoms and is substituted by —COOH —COOY$_8$, —CONH$_2$, CONHY$_9$, —ONY$_9$Y$_{10}$, —CN, —OCOY$_{11}$, or mixtures thereof; alkyl which has 4 to 20 carbon atoms which is interrupted by one or more oxygen atoms and is unsubstituted or substituted by hydroxyl or alkoxy having 1 to 12 carbon atoms; alkenyl having 3 to 6 carbon atoms, glycidyl, phenylalkyl which has 1 to 5 carbon atoms in the alkyl moiety and is unsubstituted or substituted by hydroxyl, chlorine and or methyl; —COY$_{12}$ or SO$_2$Y$_{13}$, wherein $Y_8$ is amino, alkyl amine or cycloalkylamine having from 1 to 6 carbon atoms in the alkyl portion, alkyl having 1 to 18 carbon atoms, alkenyl having 3 to 18 carbon atoms, alkyl which has 3 to 20 carbon atoms, and is interrupted by one or more oxygen atoms, or said alkyl substituted by substituted by hydroxyl; alkenyl having 3 to 18 carbon atoms, glycidyl or phenylalkyl having 1 to 5 carbon atoms in the alkyl moiety, $Y_9$ and $Y_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, $Y_{11}$ is alkyl having 1 to 18 carbon atoms, alkenyl having 2 to 18 carbon atoms or phenyl, $Y_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, $Y_{13}$ is alkyl having 1 to 18 carbon atoms, phenyl or alkylphenyl having 1 to 8 carbon atoms in the alkyl radical; and when u is 2, $Y_2$ is alkylene having 2 to 16 carbon atoms, alkylene having 4 to 12 carbon atoms and is interrupted by one or more —O— atoms and/or is substituted by hydroxyl; —CH$_2$CH(OH)CH$_2$—O—Y$_{15}$—OCH$_2$CH(OH)CH$_2$, or —(CH$_2$)$_m$—CO$_2$—Y$_{18}$—OCO—(CH$_2$)$_m$, in which m is 1,2 or 3, $Y_{15}$ is alkylene having 2 to 10 carbon atoms, phenylene or a group -phenylene-M-phenylene- in which M is —O—, —S—, —SO$_2$—, —CH$_2$— or —C(CH$_3$)$_2$—, and $Y_{18}$ is alkylene having from 2 to 10 carbon atoms or alkylene which has 4 to 20 carbon atoms and is interrupted once or several times by oxygen.

2. A cureable coating composition comprising
a durability enhancing agent comprising the reaction product of
a) compounds selected from the group consisting of hindered amine light stabilizers (HALS), ultraviolet light absorbers (UVAs), and mixtures thereof, said compounds having a reactive functionality thereon,
b) a monomeric, oligomeric, or polymeric component, having a reactive functionality thereon to react with the reactive functionlity of a),
wherein the final product includes at least one carbamate functional group, group convertible to a carbamate group, or group that crosslinks with a carbamate functional group.

3. The durability enhancing agent of claim 1 wherein the monomeric, oligomeric or polymeric component comprises the reaction product of a carbamate having residual —NCO— reactive functionality, polyol, and a UVA having a reactive functionality selected from the group consisting of hydroxyl, amine, isocyanate and epoxy functionalities.

4. The durability enhancing agent of claim 1 wherein the monomer, oligomer or polymer comprises the reaction product of polyurethane having carbamate functionality, and a UVA having at least one reactive functionality selected from the group consisting of amine, hydroxyl, epoxy and isocyanate functionality.

5. The durability enhancing agent of claim 1 wherein the oligomeric or polymeric component comprises the reaction product of an oligomeric or polymeric ester having carbamate functionality and the UVA comprises reactive functionality selected from the group consisting of ester, ether, hydroxy, acid and epoxy functionalities.

6. The durability enhancing agent of claim 1 wherein the monomer, oligomer or polymer is selected from the group consisting of ether, ester, alkyd, epoxy, urethane, urea, amide, silane, isocyanate, and aminoplast oligomeric and polymeric compositions, and mixtures thereof.

7. A curable coating composition comprising
(a) a durability enhancing agent having reactive functionality thereon comprising the reaction product of,
(i) compounds selected from the group consisting of hydroxy phenyl triazine ultraviolet light absorbers (UVAs) having the formula

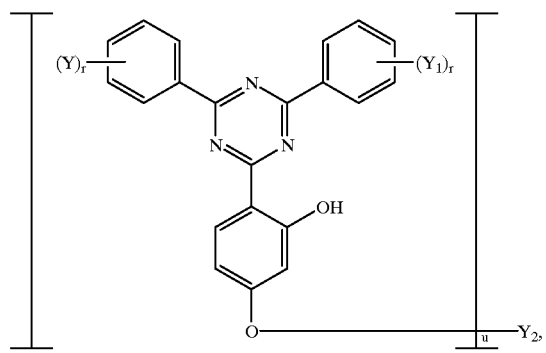

where
u is 1 to 2,
r is an integer from 1 to 3,
the substituents $Y_1$ independently of one another are hydrogen, hydroxyl, halogen, halogenomethyl, alkyl having 1 to 12 carbon atoms, alkoxy having 1 to 18 carbon atoms,
when u is 1, $Y_2$ is alkyl having 1 to 18 carbon atoms, alkyl which has 1 to 12 carbon atoms and is substituted by —COOH —COOY$_8$, —CONH$_2$, CONHY$_9$, —ONY$_9$Y$_{10}$, —CN, —OCOY$_{11}$, or mixtures thereof; alkyl which has 4 to 20 carbon atoms which is interrupted by one or more oxygen atoms and is unsubstituted or substituted by hydroxyl or alkoxy having 1 to 12 carbon atoms; alkenyl having 3 to 6 carbon atoms, glycidyl, phenylalkyl which has 1 to 5 carbon atoms in the alkyl moiety and is unsubstituted or substituted by hydroxyl, chlorine and or methyl; —COY$_{12}$ or SO$_2$Y$_{13}$, wherein Y$_8$ is amino, alkyl amine or cycloalkylamine having from 1 to 6 carbon atoms in the alkyl portion, alkyl having 1 to 18 carbon atoms, alkenyl having 3 to 18 carbon atoms, alkyl which has 3 to 20 carbon atoms, and is interrupted by one or more oxygen atoms, or said alkyl substituted by substituted by hydroxyl; alkenyl having 3 to 18 carbon atoms, glycidyl or phenylalkyl having 1 to 5 carbon atoms in the alkyl moiety, Y$_9$ and Y$_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, Y$_{11}$ is alkyl having 1 to 18 carbon atoms, alkenyl having 2 to 18 carbon atoms or phenyl, Y$_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, Y$_{13}$ is alkyl having 1 to 18 carbon atoms, phenyl or alkylphenyl having 1 to 8 carbon atoms in the alkyl radical; and when u is 2, Y$_2$ is alkylene having 2 to 16 carbon atoms, alkylene having 4 to 12 carbon atoms and is interrupted by one or more —O— atoms and/or is substituted by hydroxyl; —CH$_2$CH(OH)CH$_2$—O—Y$_{15}$—OCH$_2$CH(OH)CH$_2$, or —(CH$_2$)$_m$—CO$_2$—Y$_{18}$—OCO—(CH$_2$)$_m$, in which m is 1,2 or 3, Y$_{15}$ is alkylene having 2 to 10 carbon atoms, phenylene or a group -phenylene-M-phenylene- in which M is —O—, —S—, —SO$_2$—, —CH$_2$— or —C(CH$_3$)$_2$—, and Y$_{18}$ is alkylene having from 2 to 10 carbon atoms or alkylene which has 4 to 20 carbon atoms and is interrupted once or several times by oxygen, and (ii) a monomeric, oligomeric or polymeric component, having reactive functionality thereon to react with the reactive functionality of (i) wherein either component (i) or (ii) have more than one carbamate functional group, group convertible to a carbamate group, or a group that crosslinks with a carbamate functional group, (b) an additional oligomeric or polymeric resin comprising crosslinkable functional groups, and (c) a crosslinking agent having reactive functionality that is reactive with said crosslinkable functional groups on the durability enhancing agent and on the additional oligomer or polymer.

8. The coating composition of claim 7 wherein component a) comprises a polymer having appended thereto at least one functional group selected from the group consisting of carbamate and carbamate convertible groups, said polymers having a molecular weight greater than 2000.

9. The coating composition of claim 7 wherein the crosslinking agent is selected from the group consisting of monomeric and polymeric melamine formaldehyde resins that are fully or partially alkylated, blocked polyisocyanates, unblocked polyisocyanates, isocyanurate trimers of blocked and unblocked polyisocyanates, urea, alkoxy urea, polyanhydrides, polyepoxy and polysiloxane resins.

10. The durability enhancing agent of claim 1 wherein the monomer or oligomer has appended thereto more than one functional group selected from the group consisting of carbamate groups, and groups convertible to carbamate, and has a molecular weight of between 148 and 2000.

* * * * *